Dec. 22, 1925.
W. JAMISON
1,566,605
VALVE STRUCTURE
Filed July 22, 1925    2 Sheets-Sheet 1
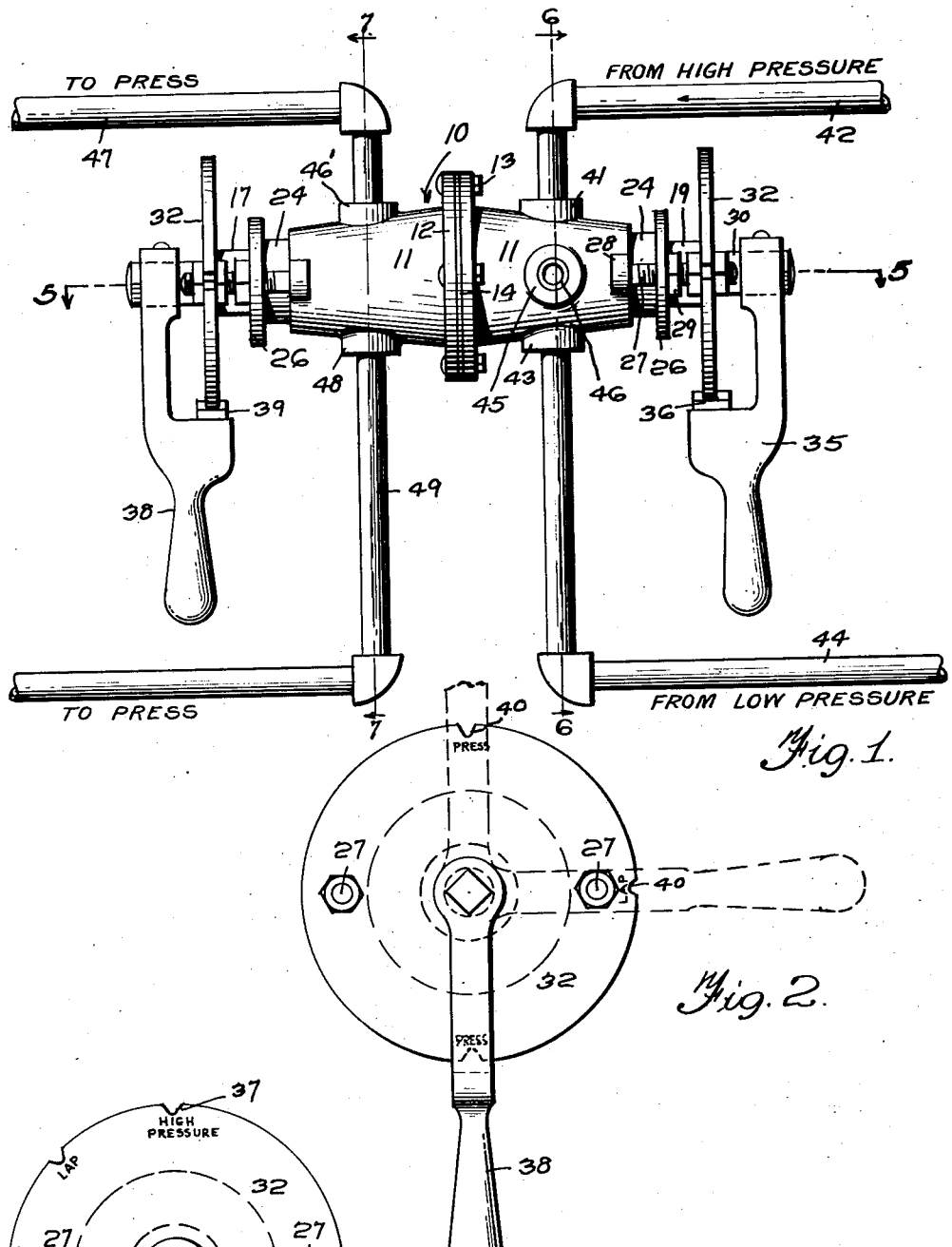
Fig. 1.
Fig. 2.
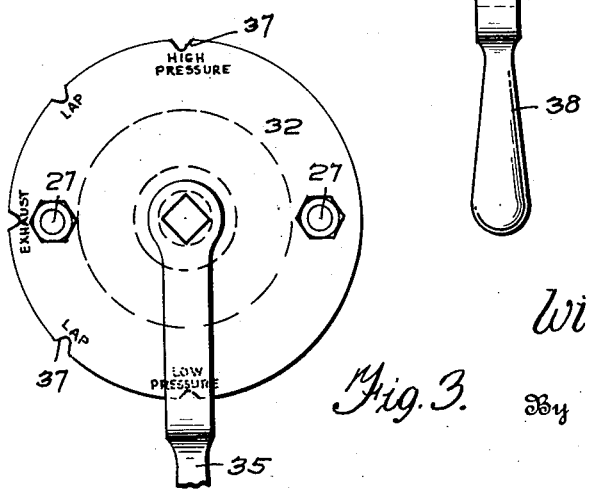
Fig. 3.
Inventor
William Jamison,
By Jerry A Matthews
Attorney Dec. 22, 1925.                                     1,566,605
W. JAMISON
VALVE STRUCTURE
Filed July 22, 1925              2 Sheets-Sheet 2

Inventor
William Jamison,
By Jerry A Mathews
Attorney

Patented Dec. 22, 1925.

1,566,605

UNITED STATES PATENT OFFICE.

WILLIAM JAMISON, OF WEST HOMESTEAD, PENNSYLVANIA.

VALVE STRUCTURE.

Application filed July 22, 1925. Serial No. 45,325.

*To all whom it may concern:*

Be it known that I, WILLIAM JAMISON, a citizen of the United States, residing at West Homestead, in the county of Allegheny and State of Pennsylvania, have invented certain new and useful Improvements in Valve Structures, of which the following is a specification.

My invention relates to a valve structure adapted for use in connection with power presses, such as are employed in the manufacture of tires.

An important object of the invention is to provide a valve structure which will control pressures, to one or more presses to produce high or low pressure, and to release or hold both pressures on each press independently.

A further object of the invention is to provide a valve structure of the above mentioned character having means whereby the valve bodies will not stick or lock.

Other objects and advantages of the invention will be apparent during the course of the following description.

Figure 4:
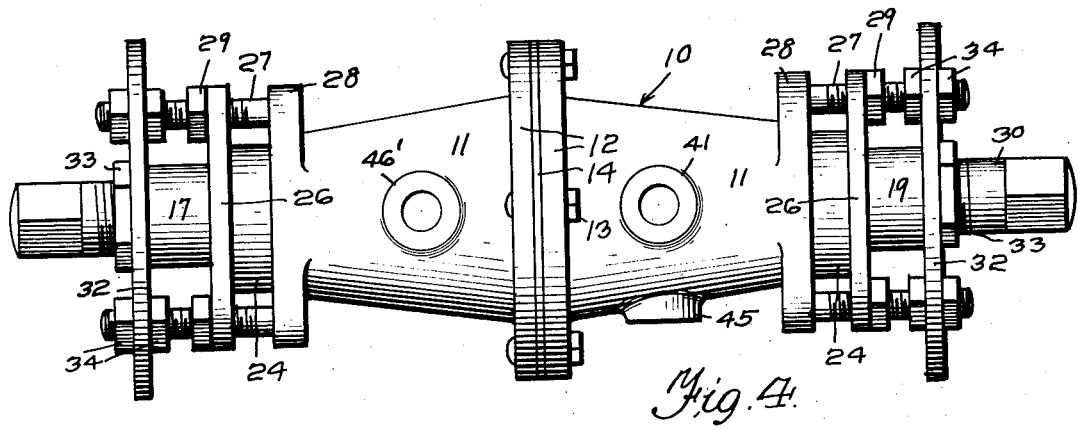
Figure 5:
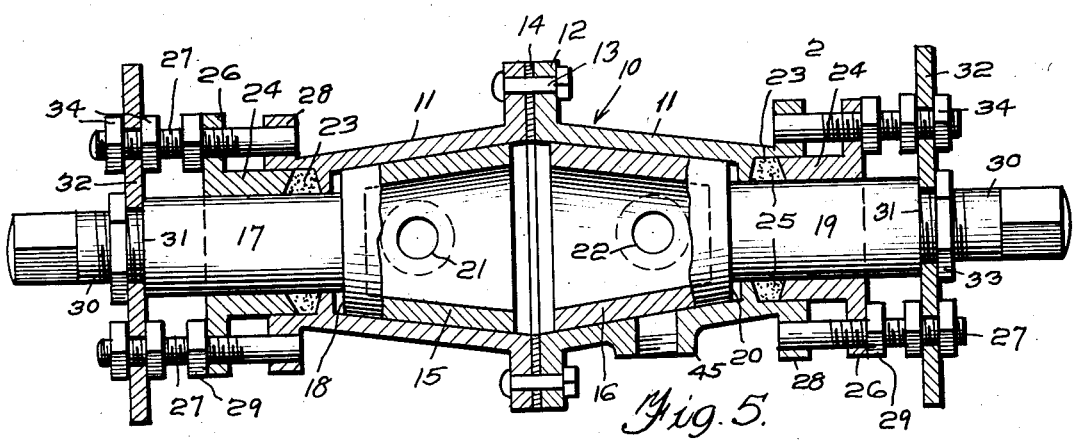
Figures 6, 7:
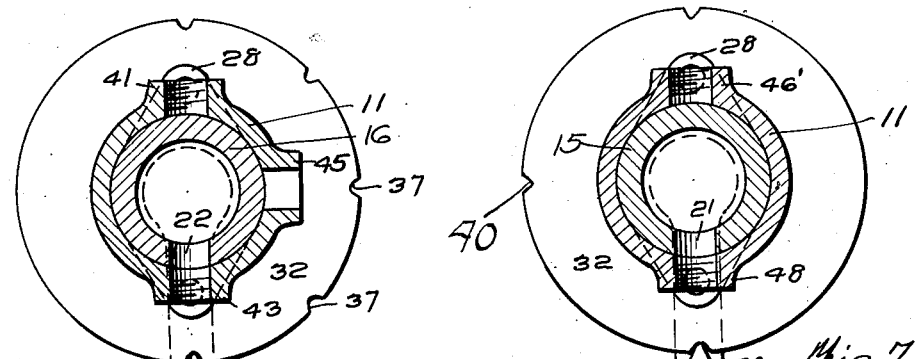

In the accompanying drawings forming a part of this specification, and in which like numerals are employed to designate like parts throughout the same, Figure 1 is a side elevation of a valve structure embodying my invention, Figure 2 is an end elevation of the press end of the valve structure, Figure 3 is a similar view of the pressure end of the valve structure, Figure 4 is a plan view of the valve structure, parts omitted, Figure 5 is a horizontal longitudinal section taken on line 5—5 of Figure 1, Figure 6 is a transverse section taken on line 6—6 of Figure 1, and, Figure 7 is a similar view taken on line 7—7 of Figure 1.

In the drawings, wherein for the purpose of illustration is shown a preferred embodiment of my invention, the numeral 10 designates a valve casing, formed of casing sections 11. These casing sections are circular in cross section and are tapered and increase in diameter inwardly, and terminate at their inner ends in radial flanges 12, which are connected by bolts 13 or the like, with packing 14 between the flanges. Rotatable within the tapered valve casing sections 11 are tapered hollow valve bodies 15 and 16, which are circular in cross section, and increase in diameter inwardly. The inner ends of these hollow valve bodies are open and in free communication with each other, as shown. The outer end of valve body 15, is rigidly mounted upon a rotatable stem 17, forming a shoulder 18, spaced from the bottom of the casing section 11. A stem 19 is rigidly attached to the outer end of the hollow valve body 16, forming a shoulder 20, spaced from the bottom of the valve casing section 11, as shown. The valve body 15 is provided with a radial opening or port 21, while the valve body 16 is provided with a radial opening or port 22.

The casing sections 11 are provided at their outer ends with stuffing boxes 23, for receiving the tubular ends of packing glands 24, which engage packing 25, the stems 17 and 19 passing through these packing glands, as shown. The packing glands have radial flanges 26, having openings to receive bolts 27, which are rigidly attached to flanges 28, carried by the outer ends of the casing sections 11. The rods or bolts 27 are screw-threaded for receiving nuts 29, by means of which the glands 24 may be adjusted toward the packing 25, as shown.

The stems 17 and 19 are provided with reduced extensions 30, forming shoulders 31. These reduced extensions are rotatably mounted through openings formed in thrust plates 32, which are preferably circular. The extensions 30 are preferably screw-threaded for receiving a nut or nuts 33, engaging the outer faces of the thrust plates. The thrust plates are provided with openings to receive the bolts 27, and the bolts are provided with nuts 34, upon opposite sides of the thrust plate. By adjusting the nuts 34, it will be seen that the thrust plate will adjust the valve body with respect to the valve casing section, and the valve body will be held against undue movement toward the casing section, whereby jamming or locking of the valve body, due to pressure, is eliminated. The thrust plates have a further purpose, to be described.

Rigidly mounted upon the outer end of the stem 30 of the valve body 16 is a radially extending handle 35, equipped with a spring pressed latch or bolt 36, adapted to engage in selected notches 37, formed upon the periphery of the thrust plate or disk 32, as shown. The valve body 16 has the radial port 22', extending radially in the same direction with the handle 35. The stem 17 has a radial lever or handle 38, rigidly secured thereto, provided with a spring pressed latch or bolt 39, to engage within notches 40, formed upon the other thrust plate or disk 32.

The casing section 11 to the right is provided in its top with a tubular boss or coupling 41, having connection with a high pressure supply pipe 42. The pipe 42 leads to a source of high fluid pressure, such as water, under high pressure, which may be at any selected pressure, such as from 100 pounds to the square inch to 1000 pounds to the square inch, more or less. Arranged preferably diametrically opposite the tubular boss 41 is a lower tubular boss 43, for connection with a low pressure supply pipe 44, leading to a source of low fluid pressure, such as water, under a pressure of 50 pounds to the square inch, more or less. Disposed between the tubular bosses 41 and 43 is an exhaust or release boss or outlet 45, for connection with a release pipe 46ˣ, leading to any desired point.

The casing section 11 to the left is provided in its top with a tubular boss or coupling 46′, for connection with a pipe 47, leading to a press or the like. Beneath and preferably diametrically opposite the tubular boss 46 is a tubular boss 48, connected with the pipe 49, leading to a press or the like. The radial port 21′ of the valve body 15, extends radially and in the same direction with the handle 38.

The operation of the valve structure is as follows:

It might be assumed that a high fluid pressure is present in the pipe 42, such as water under a pressure of 500 pounds per square inch, while a low fluid pressure may be present in the pipe 44, such as water under a pressure of 50 pounds per square inch. Instead of water any other form of fluid pressure may be employed, such as compressed air, steam, or the like, and the term fluid pressure is intended to cover either a liquid or gaseous pressure. With the lever 35 in the lower position, so that the latch or bolt 36 engages within the lowermost notch 37, the port 22′ will register with the bore of the tubular boss 43, and hence the low fluid pressure passes into the valve casing, at which time the high pressure boss 41 and the release boss 45 have their bores covered or lapped. With the lever 38 in the lowered position, Figure 2, the port 21′ will be in communication with the boss 48, and hence the low fluid pressure will pass through the valve structure into the pipe 49 and to the press connected with this pipe. While the low pressure is thus being applied to one press the lever 38 may be swung to the upper vertical position, bringing the radial port 21′ in communication with the bore of the upper boss 46′, whereby the low pressure will be supplied through the pipe 47 to the other press, at which time the bore of the boss 48 is lapped, and the low pressure is held on the other press. Should it be desired to exhaust the low pressure from either press, the handle 38 is first shifted to the position to place either pipe 47 or 49 in communication with the interior of the valve casing 10, and then the handle 35 is shifted to the horizontal position, so that its catch 36 engages in the exhaust notch. This will bring the port 21′ in register with the release or exhaust boss 45, while the bores of the bosses 41 and 43 are covered. The low pressure will therefore exhaust from the selected press. In a similar manner the press may first be selected by manipulation of the lever 38, to place it in communication with the interior of the casing, 10, and then the high pressure may be supplied to this press, by swinging the lever 35 to the upper vertical position so that its catch or bolt 36 engages in the high pressure notch 37. The radial port 22′ will now be in communication with the bore of the tubular boss 41, and the high pressure will pass through the casing 10 to the selected press. The low pressure is cut off since the boss 43 is lapped by the valve body. The high pressure may be held upon the selected press by shifting the lever 38 to the horizontally lapped position. It is thus seen that either a high or low pressure may be supplied to either press, and this pressure may be held upon the press, and exhausted from either press when desired.

The pressure acting between the lapped valve bodies 15 and 16 tends to force them outwardly against their casing sections 11, but locking or jamming of them upon the casing sections is prevented by the thrust plates or disks 32, as explained.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A valve structure comprising a pair of casing sections which are tapered and increase in diameter inwardly, means for connecting the casing sections at their inner large ends, one casing section having a plurality of pressure inlet openings and a pressure release opening and the other casing section having a plurality of outlet openings adapted to lead to presses or the like, a tapered valve body mounted to turn in the first named casing section and having a radial port adapted to be alternately brought into communication with the inlet openings and release opening, means to turn the tapered valve body, a second tapered valve body mounted to turn within the second named casing section and having a radial port adapted to be alternately moved into communication with the outlet openings, the inner large ends of the valve bodies being open and in communication, and means to turn the valve bodies.

2. A valve structure comprising a pair of casing sections which are tapered and increase in diameter inwardly, means for connecting the inner ends of the casing sections, one casing section having a plurality of pressure inlet openings and a pressure release opening and the other casing section having a plurality of outlet openings, a tapered valve body increasing in diameter inwardly and mounted to turn in the first named casing section and having a port to co-operate with the inlet openings and release opening, a second tapered valve body increasing in diameter inwardly mounted to turn within the second named casing section and having a radial port to co-operate with the outlet openings, the inner ends of the valve bodies being open and in communication, stems connected with the outer ends of the valve bodies, thrust plates slidably engaging the stems and adjustably connected with the casing sections, and means to turn said stems.

3. A valve structure comprising a pair of casing sections which are tapered and increase in diameter inwardly, means for connecting the inner ends of the casing sections, one casing section having a port or ports formed therein and the other casing section having a port or ports formed therein, hollow tapered valve bodies increasing in diameter inwardly rotatably mounted within the casing sections and having radial ports for co-action with the first named ports, stuffing boxes carried by the outer ends of the casing sections, stems extending through the stuffing boxes and attached to the valve bodies, thrust plates having slidable connection with the stems, adjusting bolts connecting the thrust plates and the ends of the casing sections, and means to turn said stems.

4. A valve structure comprising a pair of casing sections which are tapered and increase in diameter inwardly, said casing sections having ports, a pair of hollow tapered valve bodies increasing in diameter inwardly rotatably mounted within the casing sections and having ports to co-act with the first named ports, stuffing boxes carried by the outer ends of the casing sections, stems secured to the valve bodies and extending through the stuffing boxes, thrust plates having slidable engagement with the stems and provided with position indicating means, adjustable means connecting the thrust plates with the casing sections, and levers connected with the stems and arranged near the thrust plates and having elements to engage the thrust plates for co-action with the position indicating means.

5. In a valve structure, a casing provided with a tapered valve seat, a tapered body mounted within the casing and having a stem extending to the exterior of the casing, a thrust element having a swiveled connection with the stem to permit the same to rotate and to shift the stem inwardly and outwardly with respect to the casing, and adjustable means connecting the thrust element with the casing and adapted to move the thrust element inwardly and outwardly with relation to the valve casing and to lock the same against longitudinal movement at a selected adjusted position.

In testimony whereof I affix my signature.

WILLIAM JAMISON.